(12) United States Patent
Lehmann

(10) Patent No.: US 6,712,423 B2
(45) Date of Patent: Mar. 30, 2004

(54) FOLDING PICKUP TRUCK WIND DEFLECTION SYSTEM AND METHOD

(76) Inventor: Harry V. Lehmann, 4 Vineyard Ct., Novato, CA (US) 94947

( * ) Notice: Subject to any disclaimer, the term of this patent is extended or adjusted under 35 U.S.C. 154(b) by 0 days.

(21) Appl. No.: 10/133,475

(22) Filed: Apr. 29, 2002

(65) Prior Publication Data

US 2002/0163223 A1 Nov. 7, 2002

Related U.S. Application Data

(60) Provisional application No. 60/287,422, filed on May 1, 2001.

(51) Int. Cl.[7] ............................................. B62D 37/02
(52) U.S. Cl. ...................................... 296/180.1; 16/374
(58) Field of Search ............................ 296/180.1, 180.2, 296/57.1; 16/374

(56) References Cited

U.S. PATENT DOCUMENTS

| | | | |
|---|---|---|---|
| 2,603,529 A | * | 7/1952 | Troth et al. .................. 296/61 |
| 4,451,075 A | | 5/1984 | Canfield |
| 4,506,870 A | * | 3/1985 | Penn |
| 4,585,263 A | * | 4/1986 | Hesner |
| 4,884,838 A | | 12/1989 | Slater |
| 5,069,498 A | | 12/1991 | Benchoff |
| 5,147,103 A | * | 9/1992 | Ducote ....................... 296/37.6 |
| D360,395 S | * | 7/1995 | Almen ........................ D12/180 |
| 5,435,616 A | | 7/1995 | Corner |
| 5,498,058 A | | 3/1996 | Kuo |
| 5,551,747 A | | 9/1996 | Larsen |
| 5,722,714 A | | 3/1998 | Vallerand |
| 5,735,567 A | | 4/1998 | Mora, Sr. |
| 5,743,589 A | | 4/1998 | Felker |
| 6,059,350 A | * | 5/2000 | Kooiker ................... 296/100.09 |
| 6,325,448 B1 | | 12/2001 | Estrada et al. |

* cited by examiner

Primary Examiner—Stephen T. Gordon
Assistant Examiner—Lori L Coletta
(74) Attorney, Agent, or Firm—Duane Morris LLP

(57) ABSTRACT

A system and method for deflecting the wind which would otherwise impinge upon the tailgate of a pickup truck, the deflector being removably mounted on the tailgate to preserve cargo space, including a spoiler, and requiring no modification to the tailgate or the truck bed, the deflector being made of relatively thin, lightweight panels with a large area brace and gust straps for resisting the pressure of the relative wind.

21 Claims, 2 Drawing Sheets

FOLDING PICKUP TRUCK WIND DEFLECTION SYSTEM AND METHOD

RELATED APPLICATIONS

This application is related to and claims the priority of U.S. Provisional Patent Application Ser. No. 60/287,422 entitled "Tailgate Sail" filed May 1, 2001, the disclosure of which is incorporated herein by reference.

BACKGROUND OF THE INVENTION

The present invention relates to a system and method for deflecting the wind which would otherwise impinge upon the tailgate of a pickup truck.

The adverse effects of wind on the forward facing surface of the tailgate of a pickup truck are well known and many have addressed the problem by providing a rearwardly and upwardly inclined surface deflecting the wind up and over the tailgate when the truck bed is not filled with cargo. Often, such deflectors are in combination with the definition of storage areas (see, e.g. the Canfield U.S. Pat. No. 4,451,075 and the Kuo U.S. Pat. No. 5,498,058), loading ramps (see, e.g. the Slater U.S. Pat. No. 4,884,838), etc. and thus require substantial modification of the truck bed and/or tailgate. Many of the single function devices also require modification of the truck bed and/or the tailgate of the pickup truck to store the deflector when not deployed (see, e.g. the Corner U.S. Pat. No. 5,435,616).

Others such as that disclosed in the Larsen U.S. Pat. No. 5,551,747 address the stowage problem by providing a false floor which is hinged to the bed at the front end thereof so that the rear end thereof may be selectively raised and lowered. In addition to the requirement that the bed of the truck be modified, the presence of the deflector on the bed is problematical and an unsatisfactory gap is created between the raised end of the deflector and the tailgate.

Other known attempts to address the storage problem have constructed the deflector in two panels and telescoped one panel within the other panel so that the telescoped panels may be stored flat against the closed tailgate when not deployed. Examples of such deflectors are disclosed in the Benchoff U.S. Pat. No. 5,069,498 and the Mora, Sr. U.S. Pat. No. 5,735,567. These telescoping devices necessarily have substantial thickness inasmuch as the telescoped panel must have sufficient structural integrity to resist the substantial pressure of the relative wind generated by high speed driving, and the telescoping panel must overlie and structurally support the telescoped panel. Still additional thickness is required if the assembly includes laterally extendable panels to accommodate truck beds of different widths, and the construction of such complicated assemblies is generally expensive.

Attempts to address the storage problem without resorting to telescoping structures include the hinging of the two panels and the folding thereof against the closed tailgate. As disclosed, for example, in the Vallerand U.S. Pat. No. 5,722,714, the maintenance of the panels in the deployed position is accomplished by fastening the distal end of the forward panel to the truck bed. This requires modification of the truck bed and increases the difficulty in deploying and storing the deflector.

Still other systems such as disclosed in the Felker U.S. Pat. No. 5,743,589 avoid the necessity for attaching the distal end of the forward panel to the truck bed by making the panels sufficiently rigid and thick, and by the location of the hinges used to connect the panels that the abutting edges of the panels limit the rotation of the forward panel upwardly beyond the plane of the rear panel. The force of the relative wind is concentrated on the hinged junction, and, in general, such structures have proven unsatisfactory because of the thickness and strength of materials required to mechanically resist the force of the relative wind.

Accordingly, it is an object of the present invention to obviate many of the above problems in known systems and to provide a novel system and method for deflecting the relative wind from the closed tailgate of a pickup truck.

It is another object of the present invention to provide a novel wind deflector and method that permits the use of thinner, relatively lightweight panels through a brace carried by the upper panel and overlapping the lower panel to limit the forward rotation thereof.

It is yet another object of the present invention to provide a novel wind deflector and method that requires no cargo interfering modification of the truck bed or the tailgate.

It is a further object of the present invention to provide a novel wind deflector and method in which the angle of the deflector relative to the truck bed, and/or the shape of the deflector, may easily be adjusted to increase aerodynamic efficiency.

It is an additional object of the present invention to provide a novel wind deflector and method for integrating a spoiler into the deflector.

It is yet an additional object of the present invention to provide a novel stand-alone lightweight wind deflector which may be easily and quickly installed on and removed from the tailgate of a pickup truck.

It is yet a further object to provide a novel deflector and method with means for supporting the rigidity of the deployed deflector.

These and many other objects and advantages of the present invention will be readily apparent to one skilled in the art to which the invention pertains from a perusal of the claims, the appended drawings, and the following detailed description of the preferred embodiments.

DESCRIPTION OF PREFERRED EMBODIMENTS

Figure 3:
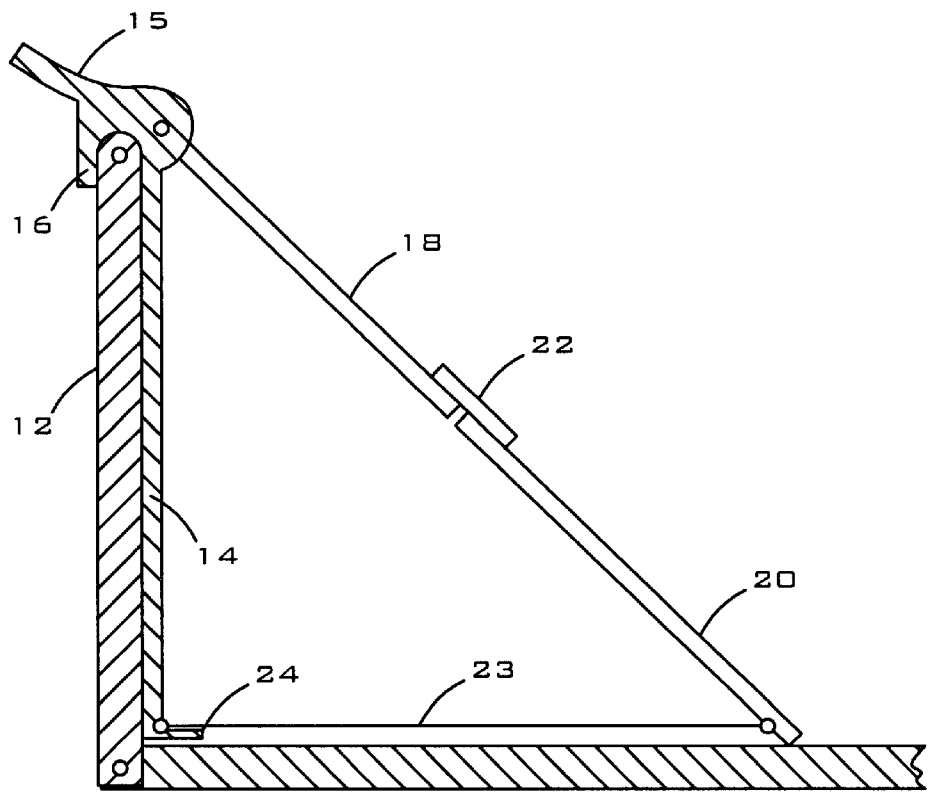
FIG. 3 is an elevation in cross-section of a second embodiment of the wind deflector of the present invention with the deflector fully deployed and with a gust strap.

Referring to the Figures where like numerals represent like components, the deflector includes a mount 10 shown overlying the top of a closed tailgate 12. The deflector may be retained on the tailgate 12 in any suitable conventional way, preferably by frictional engagement of the arms 14, 16 of the mount 10 with the tailgate 12 across the entire width thereof, and may be made of any suitable material such as a molded high impact plastic. It has been found desirable to extend the arm 14 downwardly to the truck bed as shown in FIG. 3, and to make it coextensive with the inside surface of the closed tailgate to increase the relatively lower pressure which will have to be overcome to lift the leg 14 away from the tailgate. For safety reasons, a suitable threaded fastener may be used, preferably adjacent the truck bed for maximum leverage, to secure the mount to the tailgate. The extension of the arm 14 is also useful in that it provides a place where a suitable conventional latch 24 may be mounted for the purpose of retaining the two panels 18, 20 tight against the closed tailgate when not deployed.

The mount 10 extends rearwardly from the tailgate to form a spoiler 15 that extends across the width of the tailgate 12 for the air exiting the truck bed.

Figure 1:
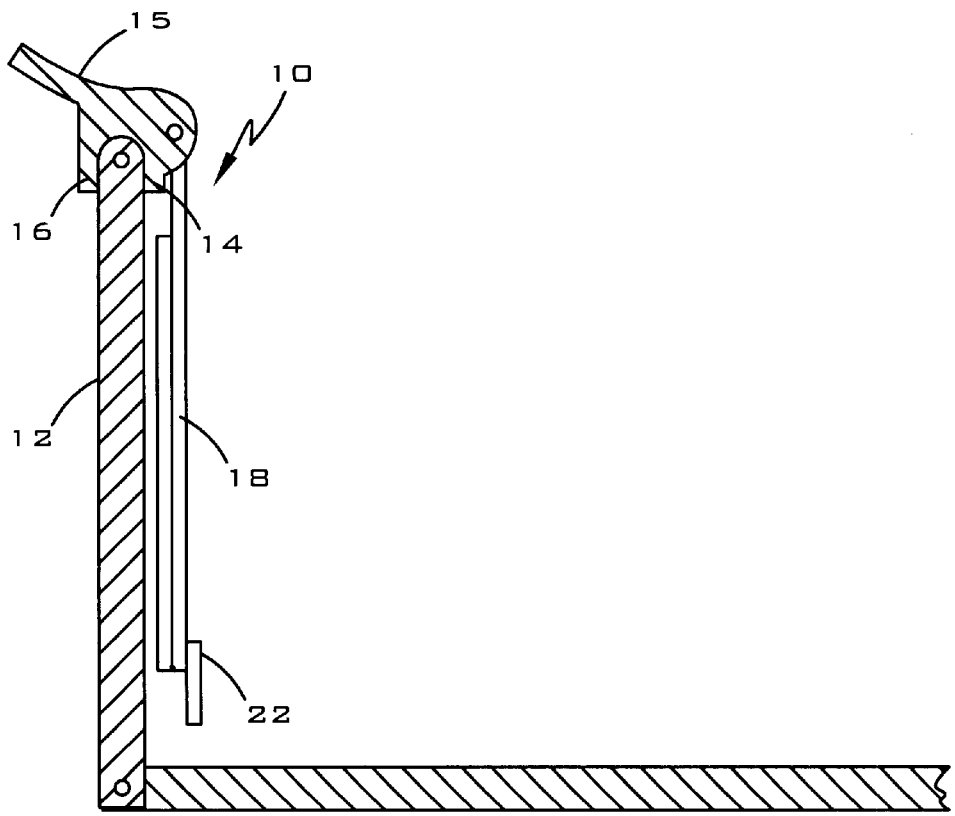
FIG. 1 is an elevation in cross-section illustrating one embodiment of the wind deflector of the present invention with the deflector stored against the closed tailgate.
Figure 2:
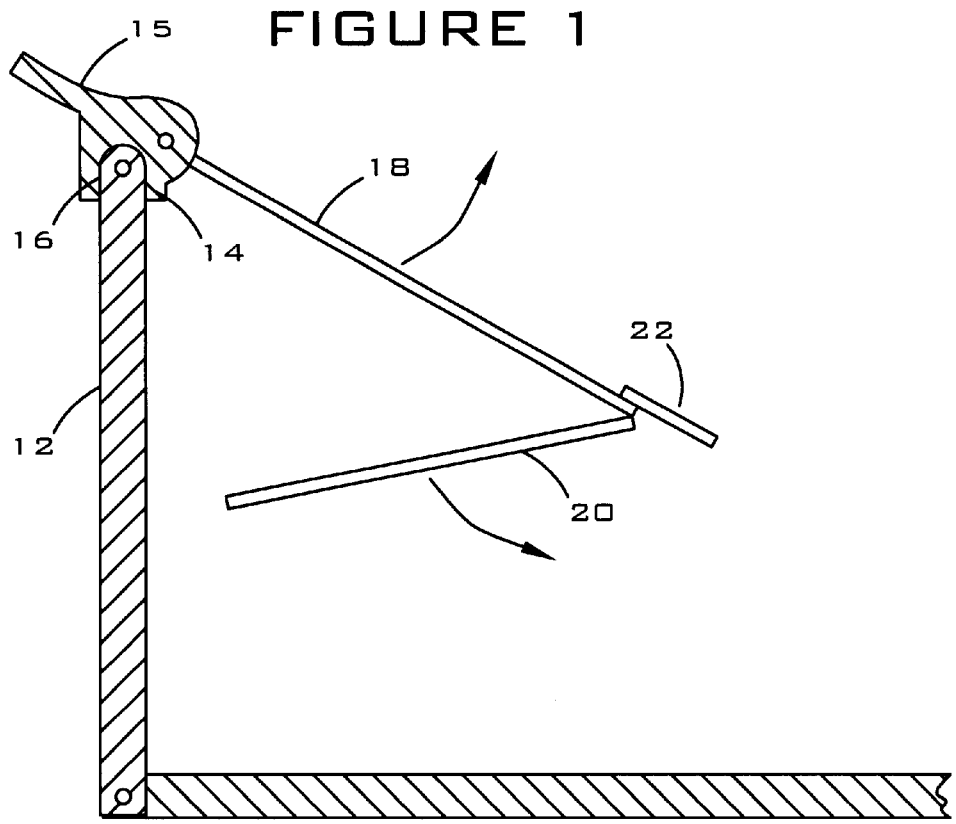
FIG. 2 is an elevation in cross-section of the embodiment of FIG. 1 with the deflector in a position intermediate the stored and deployed position.

The deflector includes an upper or rear panel 18 and a lower or forward panel 20. The upper panel 18 is hinged or otherwise pivotably secured to the mount 10 in a suitable conventional manner for forward rotation from a vertical position alongside the closed tailgate to an angled position relative to the truck bed as shown in FIGS. 2 and 3. The proximate end of the lower panel 20 is hinged or otherwise pivotably secured to the distal end of the upper panel 18 in a suitable conventional manner for forward rotation from a vertical position alongside the closed tailgate to an angled position relative to the truck bed as shown in FIG. 3, substantially coplanar with the upper panel 18.

As shown in the Figures, the upper panel 18 is provided with a brace 22. The brace 22 is fixedly secured to the forward facing surface of the upper panel 18 in a suitable conventional manner and overlies the forward facing surface of the lower panel 20 when fully deployed without any attachment thereto.

The angle of the coplanar panels 18, 20, each less than about ⅜ inch thick, relative to the truck bed is a function of the height of the tailgate 12 and the length of the panels 18, 20. Note that the distal end of the lower panel 20 is not attached in any way to the truck bed, but rests thereon. It is the function of the brace 22 to prevent the lower panel from rotating beyond the plane of the upper panel 18. Other mechanical means may be used, but it has been found particularly advantageous, to use a brace which extends across the full width of the panels 18, 20 and which overlies the junction for several inches, i.e. at least about one and one half inch, on both sides thereof to provide a large surface area over which the force of the relative wind can be spread. The brace 22 is desirably faired or tapered at both the top and bottom edges to provide for smooth air flow across the junction of the panels 18, 20.

The force of the relative wind tends to force the junction of the two panels 18 20 downward putting pressure on the proximate end of the lower panel 20 brace. Since the proximate end of the lower panel 20 is restrained by the hinged connection to the upper panel 18, and since the distal end of the lower panel 20 is restrained by contact with the truck bed, the downward pressure of the proximate end of the lower panel 18 tends to rotate the lower panel 20 forward of the plane of the upper panel 18, which rotation is resisted by the brace 22, rather than by abutment of the ends of the panels 18, 20. This pressure tends to lift the brace 22 away from the upper panel 18 and the relatively large area of contact between the brace 22 and the upper panel 18 spreads that pressure and permits the use of thinner panels.

There are swirls and eddies and gusts of wind which impact the deflector. The passage of air over the panels tends to create a low pressure area over the panels which tends to lift the distal end of the lower panel 20 off of the truck bed. This is disadvantageous in that air under the panels will tend to lift the panels as a unit and further stress the junction of the panels. To combat this, it has been found advantageous to anchor the distal end of the lower panel 20. Since no attachment can be made to the truck bed without the modification thereof, it has been found advantageous to extend the arm 14 of the mount downwardly to the truck bed as shown in FIG. 3. The lower end of this extension 14 may then serve as the place of attachment of one or more flexible lines or straps which can be connected at spaced apart points to the distal end of the lower panel 20. The presence of such "gust straps" tends to maintain the distal end of the lower panel 20 in contact with the truck bed will resist the lifting of the two panels as a unit and will reduce the pressure on the junction of the two panels. The gust straps are desirably made of a semi-rigid plastic material with a memory or crease lines 25 so that the gust strap tends to fold between the two panels 18, 20 as the panels are stored against the tailgate.

Of course, the shape of the lower panel 20 may be dimensioned to conform to the location of the wheel wells of a particular truck bed without interfering with the ease of storage and deployment of the panels. The distal end of the lower panel may also be made to conform to any corrugations in the truck bed or its liner. If convenient to have the two panels 18, 20 the same width, additional width may be provided for the portion thereof rearward of the wheel wells by fold-outs secured to the truck body or bed liner by Velcro® hook and loop strips, snaps, buttons or the like.

The thinness of the panels relative to known panels is an advantage in that weight is decreased and the panels may deflect somewhat to accommodate short lived forces without unduly stressing the junction of the panels or the attachment of the brace 22 to the upper panel 18.

Figure 4:
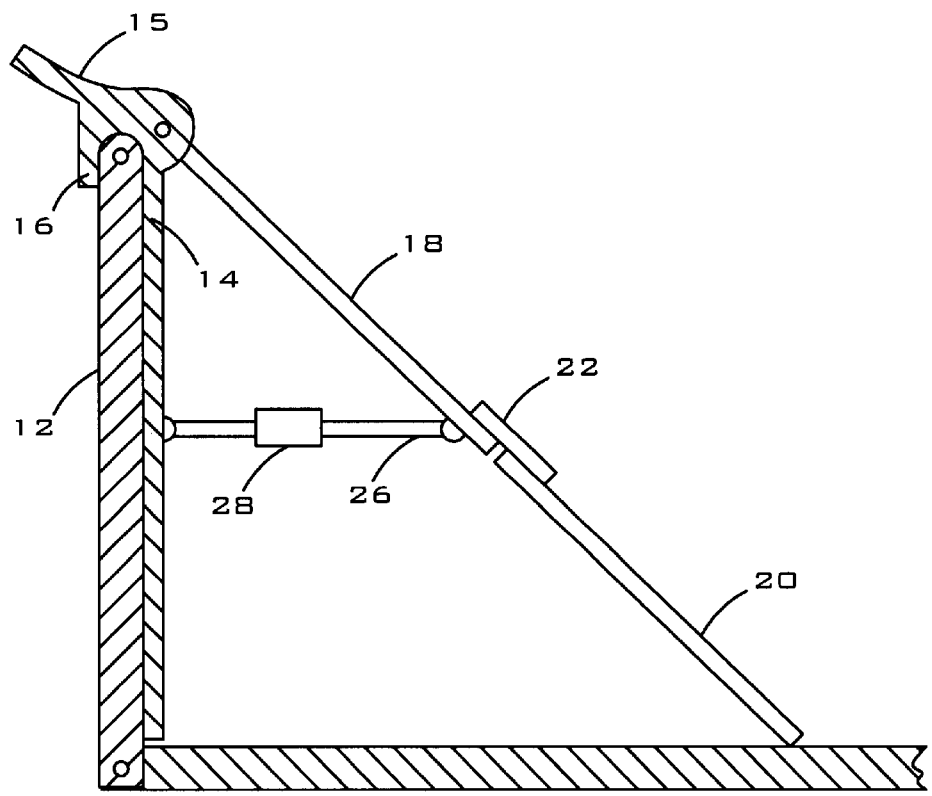
FIG. 4 is an elevation in cross-section of a third embodiment of the deflector of FIG. 3 showing the local and/or remote adjustability of the shape of the deflector.

As shown in FIG. 4, an adjustable length connection may be established between the junction of the two panels 18, 20 and the extended leg 14 of the deflector mount. This connection may be any suitable conventional mechanical connection with sufficient strength to control the deflection of the panels. By way of example, the device may be a rod 26 with a screw jack adjustment 28. Desirably, the rod is pivotally mounted so that it may be laterally swung into a channel in the extension 14 so as to avoid interfering with the storage of the deflector panels 18, 20 adjacent the closed tailgate. The forward end of the rod 26 may be attached to the upper panel 18 or through the junction to the brace 22. Alternatively, the rod may be removed for storage of the deflector and inserted upon deployment.

In other embodiments, a sissor jack may be employed so that the shaft remains parallel to the tailgate and the screw action deploys and retracts the jack.

The adjustment of the length of the rod 26 may be manually or electrically accomplished locally or remotely controlled from the cab of the pickup. The control may also be automatic in response to conventional sensors located on the deflector or alternatively controlled as a function of the speed of the pickup, sensed e.g. by the speedometer Changes in the shape of the deflector to accommodate the relative wind is important to the efficiency of the deflector in much the same manner as the shape of the sail is important to a racing sailboat. Control of the length of the gust strap attached to the distal end of the lower panel 20 provides an additional point in shaping the surface formed by the panels 18, 20.

While preferred embodiments of the present invention have been described, it is to be understood that the embodiments described are illustrative only and that the scope of the invention is to be defined solely by the appended claims when accorded a full range of equivalence, many variations and modification naturally occurring to those of skill in the art from a perusal hereof.

What is claimed is:

1. A selectively deployable wind deflector for a closed tail gate of a truck bed of a pickup truck comprising:

mounting means adapted to be removably secured to the top of the closed tail gate;

a first generally planar panel pivotably attached at the proximate end to said mounting means, said panel being substantially coextensive in width to the width of the truck bed and having a length substantially the height of the closed tail gate;

a second generally planar panel pivotably secured at the proximate end thereof to the distal end of said first panel, said panel being substantially coextensive in width to the width of the truck bed and having a length substantially the height of the closed tail gate;

a brace carried by said first panel at the distal end thereof, said brace being generally planar, substantially coextensive in width with the truck bed and overlying the junction of said first and second panels sufficiently to prevent the forward pivoting of said second panel relative to the plane of said first panel, said second panel being selectively pivotable rearwardly with respect to the plane of said first panel into a position generally parallel to the plane of said first panel, and said first panel being selectively pivotable into a position substantially parallel to the tail gate.

2. The deflector of claim 1 wherein said brace is fixedly secured to said first panel, has sufficient rigidity to prevent the forward rotation of said second panel beyond the plane of said panel, and extends not less than about one and one half inches over the proximate end of said second panel.

3. The deflector of claim 1 including at least two gust straps secured to said mounting means adjacent the truck bed and to the distal end of said second panel, said gust strap having a length equal to the distance from the tail gate to the point of contact of the distal end of said second panel with the bed.

4. The deflector of claim 3 wherein said gust strap includes a plurality of semi-rigid plastic straps each having at least one memory fold to facilitate the folding of the gust strap into the deflector when the deflector is stored.

5. The deflector of claim 1 wherein the thickness of said panels does not exceed about ⅜ inch.

6. The deflector of claim 1 wherein the width of said second panel conforms to the width of the truck bed between the wheel wells.

7. The deflector of claim 1 wherein said mounting means includes a rearwardly extending spoiler.

8. In a selectively deployable wind deflector for a closed tail gate of a truck bed of a pickup truck having two panels hinged together which collectively extend substantially across the width of the truck bed from a first position adjacent the top of the closed tail gate downwardly and forwardly to a second position adjacent the truck bed at a point rearward of the midpoint between the front and rear ends of the truck bed to reduce the drag caused by the tail gate as the pickup truck moves forwardly through the air, the improvement including means carried by the panel adjacent the tail gate to restrict the pivoting of the panel adjacent the truck bed forwardly of the plane of the first panel.

9. The deflector of claim 8 including a tail gate mount having a plurality of spaced apart flexible plastic straps each attached adjacent the truck bed and to the distal end of said second panel and having a length approximately equal to the distance from the tail gate to the point of contact of the distal end of said second panel with the bed.

10. The deflector of claim 9 wherein each of said straps has at least one memory fold to facilitate the folding of said straps into the deflector when the deflector is stored.

11. The deflector of claim 8 including a spoiler rearwardly extending over the tail gate.

12. In a selectively deployable wind deflector for a closed tail gate of a truck bed of a pickup truck having two panels hinged together which collectively extend substantially across the width of the truck bed from a first position adjacent the top of the closed tail gate downwardly and forwardly to a second position adjacent the truck bed at a point rearward of the midpoint between the front and rear ends of the truck bed to reduce the drag caused by the tail gate as the pickup truck moves forwardly through the air, the improvement wherein the deflector includes means for mounting it for selective deployment and storage on the tail gate of the pickup truck without modification of the truck bed or the tail gate, said deflector including a spoiler which extends over and rearwardly beyond the tail gate.

13. In a selectively deployable wind deflector for a closed tail gate of a truck bed of a pickup truck having two panels hinged together which collectively extend substantially across the width of the truck bed from a first position adjacent the top of the closed tail gate downwardly and forwardly to a second position adjacent the truck bed at a point rearward of the midpoint between the front and rear ends of the truck bed to reduce the drag caused by the tail gate as the pickup truck moves forwardly through the air, the improvement wherein the panels have not greater than about ⅜ inch in thickness and do not abut each other when the deflector is deployed.

14. The deflector of claim 13 wherein the distal end of the second panel is not attached to the truck bed.

15. The deflector of claim 13 including a generally planar panel carried by said first panel and overlying a portion of said second panel adjacent said first panel across the width thereof.

16. The deflector of claim 15 including a gust strap.

17. A selectively deployable wind deflector for a closed tail gate of a truck bed of a pickup truck comprising:

first and second panels hinged together which collectively extend substantially across the width of the truck bed from a first position adjacent the top of the closed tail gate downwardly and forwardly to a second position adjacent the truck bed at a point rearward of the midpoint between the front and rear ends of the truck bed to reduce the drag caused by the tail gate as the pickup truck moves forwardly through the air;

means for removably mounting said first and second panels on the tail gate of a pickup truck without modification of the truck bed or the tail gate of the pickup truck; and a spoiler carried by said mounting means above and to the rear of the tail gate when the deflector is mounted; and at least two gust straps secured to said mounting means adjacent the truck bed and to the distal end of said second panel.

18. The deflector of claim 1 including means for adjusting the distance from the closed tailgate to the junction of the two panels when deployed to thereby modify the shape of the deflector formed by said two panels.

19. The deflector of claim 1 including means for adjusting the distance from the closed tailgate to the distal end of said second panel to thereby modify the shape of the deflector formed by said two panels.

20. A selectively deployable wind deflector for a closed tail gate of a truck bed of a pickup truck comprising:

mounting means adapted to be removably secured to the top of the closed tail gate with a log downwardly extending adjacent the forward facing surface of the closed tail gate into proximity to the truck bed;

a first generally planar panel pivotably attached at the proximate end to said mounting means, said first panel being substantially coextensive in width to the width of the truck bed, having a length approximately the height of the closed tail gate, having a thickness less than about ⅜ inch, and being selectively downwardly pivotable into a position substantially parallel to said leg;

a second generally planar panel pivotably secured at the proximate end thereof to the distal end of said first panel, said second panel being substantially coextensive in width to the width of the truck bed between the wheel wells, having a length approximating the height of the closed tail gate, having thickness less than about ⅜ inch, and being selectively pivotable with respect to the plane of said first panel rearwardly into a position generally parallel to the plane of said first panel;

a brace carried by said first panel at the distal end of said first panel, said brace being generally planar, substantially coextensive in width with the truck bed and overlying the junction of said first and second panels sufficiently to prevent the upwardly and forward pivoting of said second panel beyond the plane of said first panel; and flexible means secured to said leg adjacent the distal end thereof and secured to the distal end of said second panel, said flexible means having a length equal to the distance along the truck bed from the tail gate to the point of contact of the distal end of said second panel with the truck bed when said first and second panels are deployed and substantially coplanar, the combined action of said brace and said flexible means limiting the upward movement of the distal end of said second panel when deployed from a position adjacent the truck bed without the need for attachment of the distal end of said second panel to the truck bed.

21. The deflector of claim 20 wherein said mounting means includes a spoiler which extends rearwardly beyond the tail gate; and wherein said flexible means includes a plurality of plastic straps each having at least one memory fold to facilitate the folding thereof between said first and second panels when said first and second panels are undeployed and stored substantially parallel to the tail gate.

* * * * *